United States Patent
Sintorn et al.

(10) Patent No.: US 8,408,572 B2
(45) Date of Patent: Apr. 2, 2013

(54) STEERING DAMPER WITH ACTIVE ADJUSTMENT OF DAMPING CHARACTERISTICS

(75) Inventors: Torkel Sintorn, Vaxholm (SE); Johan Nilsson, Upplands Vasby (SE); Leif Gustafsson, Holmsjo (SE); Thorleif Hansen, Upplands Vasby (SE); Joakim Mattison, Upplands Vasby (SE)

(73) Assignee: Ohlins Racing AB, Upplands Vasby (SE)

(*) Notice: Subject to any disclaimer, the term of this patent is extended or adjusted under 35 U.S.C. 154(b) by 0 days.

(21) Appl. No.: 13/508,330

(22) PCT Filed: Nov. 5, 2010

(86) PCT No.: PCT/EP2010/066932
§ 371 (c)(1),
(2), (4) Date: May 4, 2012

(87) PCT Pub. No.: WO2011/054934
PCT Pub. Date: May 12, 2011

(65) Prior Publication Data
US 2012/0228849 A1    Sep. 13, 2012

(30) Foreign Application Priority Data

Nov. 6, 2009  (WO) .................. PCT/EP2009/064774

(51) Int. Cl.
*B62K 21/08*  (2006.01)
(52) U.S. Cl. ....................................... 280/272; 280/283
(58) Field of Classification Search .................. 280/272, 280/276, 279, 283; 188/306
See application file for complete search history.

(56) References Cited

U.S. PATENT DOCUMENTS

| | | | |
|---|---|---|---|
| 4,773,514 A | 9/1988 | Gustafsson | |
| 4,961,482 A | 10/1990 | Pohlenz et al. | |
| 5,404,961 A * | 4/1995 | Huber | 180/417 |
| 6,145,637 A | 11/2000 | Hopey | |
| 6,742,794 B2 * | 6/2004 | Bunya et al. | 280/272 |
| 2004/0046351 A1 | 3/2004 | Morgan | |
| 2009/0008197 A1 | 1/2009 | Kamiya et al. | |
| 2011/0056782 A1 * | 3/2011 | Gustafsson | 188/290 |

FOREIGN PATENT DOCUMENTS

| | | |
|---|---|---|
| EP | 0409094 | 1/1991 |
| EP | 1248013 | 10/2002 |
| EP | 1477397 | 11/2004 |
| JP | 2007-016979 | 1/2007 |
| WO | WO 2006/137788 | 12/2006 |
| WO | WO 2007/053944 | 5/2007 |
| WO | WO 2007/134703 | 11/2007 |

OTHER PUBLICATIONS

International Search Report dated Jun. 4, 2011 for International Application No. PCT/EP2010/066932, which is the parent application, in 5 pages.

* cited by examiner

*Primary Examiner* — Tashiana Adams
(74) *Attorney, Agent, or Firm* — Knobbe Martens Olson & Bear, LLP

(57) ABSTRACT

A steering damper varies damping based upon the input source: the steering device or the ground contact parts. The device comprises a housing fixed on an attaching part that couples the steering device and the ground contact parts. A main chamber is partitioned into a first and second damping chamber and flow is at least partially controlled by a main valve unit. The opening area of the main valve unit is determined by a relative motion between the attaching part and the steering device.

42 Claims, 7 Drawing Sheets

STEERING DAMPER WITH ACTIVE ADJUSTMENT OF DAMPING CHARACTERISTICS

CROSS-REFERENCE TO RELATED APPLICATIONS

This application is a national stage application under 35 U.S.C. §371 of PCT Application No. PCT/EP2010/066932 designating the United States, filed Nov. 5, 2010. The PCT Application was published in English as WO 2011/054934 A1 on May 12, 2011 and is a continuation-in-part and claims the benefit of the earlier filing date of PCT Application No. PCT/EP2009/064774, filed Nov. 6, 2009. The contents of PCT Application No. PCT/EP2009/064774 and PCT Application No. PCT/EP2010/066932 including the publication WO 2011/054934 A1 are incorporated herein by reference in their entirety.

BACKGROUND OF THE INVENTION

1. Field of the Invention

The present invention relates to an adjustable steering damper intended to be used on a two or four-wheeled vehicle having a steering device comprising a handlebar or a steering wheel rotatable about a steering axis. Preferably the vehicle is a motorcycle, a snowmobile or an ATV. The steering damper is mounted at the steering device and is also coupled together with the frame or chassis by means of an attaching device. The damper is composed of an outer housing in which a main chamber is arranged, the main chamber comprising hydraulic fluid. The main chamber is partitioned into two chambers, for example by means of a delimiting part that is either rotatable about a first end or laterally displaceable in the chamber. The flow of the hydraulic fluid between the chambers is adjusted by a main valve and enables an adjustable damping of the relative motion between the steering device and the frame/chassis.

2. Description of the Related Art

A steering damper is mounted between the rotating handlebar or steering wheel of a vehicle and its fixed frame or chassis in order to damp shocks and violent movements that propagate from the front wheel(s) to the handlebar. When the steering damper is used on a motorcycle, the steering damper can also solve the problem of wobbling that may occur in a motorcycle at high speeds. Wobbling refers to the front wheel on the motorcycle beginning to oscillate about the steering axis with increasing amplitude. When the steering damper is used on a four-wheeled terrain vehicle, a so called ATV, the steering damper is primarily intended to damp the rapid steering movements caused by, for example, an asymmetric load on the wheels.

It has proven to be a problem to separate desired steering movements from undesired shocks caused by unevenness of the ground in a steering damper. In order to not create a delay in the steering movement when the driver turns the handlebar, it is desirable that this desired rotational movement is undamped. At the same time, undesired rotational movements caused by shocks from the ground should be damped as much as possible to minimize the risk of the handlebar being stricken from the hands of the driver. Thus, it is desirable to provide a steering damper that actively adapts the damping based on the cause of the movement.

In EP1248013 the problem is solved by a steering damper that by means of electronics senses and controls the damping on the handlebar depending on whether the movement is caused by the driver or the ground.

A steering damper that solves this problem by means of a principally mechanical solution is not known.

SUMMARY OF THE INVENTION

It is with respect to the above considerations and others that the present invention has been made. The present invention seeks to mitigate, alleviate, or eliminate one or more of the above-mentioned deficiencies and disadvantages singly or in combination. In particular, the inventor has realized that it would be desirable to achieve a device that enables separating the damping in a steering damper of desired steering movements from undesired shocks caused by unevenness of the ground. The inventor has further realized that it would be desirable to achieve a device that enables separating the damping in a steering damper of desired steering movements from undesired shocks caused by unevenness of the ground in a manner that does not require electronic components.

It is also desirable that the damper obtains a damping characteristic that is the same for different individuals. Furthermore, the final product should be relatively inexpensive and uncomplicated to manufacture.

To achieve this, a device and a steering device having the features as defined in the independent claims are provided. Further advantageous embodiments of the present invention are defined in the dependent claims.

Certain embodiments provide a device for adjusting the rotational damping of a steering device in a vehicle such that the rotational damping varies depending on whether the rotational movement about a steering axis is caused by a force acting on the steering device of the vehicle or by a force acting on the part(s) of the vehicle contacting the ground. In a preferred embodiment, the steering device refers to the handlebar, steering wheel, or the like of the vehicle, and parts of the vehicle contacting the ground refer to wheels, runners or similar arrangements that constitute the vehicle's points of contact against the ground. Certain embodiments further relate to a steering device adapted to be arranged in a vehicle.

The device and steering device according to the present invention are for example intended to be used on a one, two, three or four-wheeled vehicle.

In certain embodiments of the present invention, there is provided a device intended for a vehicle. The device comprises a steering device rotatable about a steering axis for adjusting the direction of the part(s) of the vehicle arranged for contacting the ground, an attaching part that couples together the part(s) arranged for contacting the ground with the steering device, and a steering damper. The attaching part rotates with the steering device and with the damping housing of the steering damper that encloses a main damping chamber. The main damping chamber comprises hydraulic fluid and is partitioned into a first and a second damping chamber, wherein flow of hydraulic fluid between the damping chambers of the steering damper is adjusted by means of a main valve unit mechanically coupled together with both the attaching part and the steering device in order to adjust the rotational damping of the steering device. The amount of hydraulic fluid flowing through the main valve unit is determined by a relative movement between the attaching part and the steering device.

Certain embodiments of the present invention provide a device intended for a vehicle. The device comprises a steering device rotatable about a steering axis for adjusting the direction of the part(s) of the vehicle arranged for contacting the ground, an attaching part that couples together the part(s) arranged for contacting the ground with the steering device, and a steering damper. The attaching part rotates with the steering device and with a delimiting part of the steering damper that partitions a main damping chamber which comprises hydraulic fluid into a first and a second damping chamber, wherein flow of hydraulic fluid between the damping chambers of the steering damper is adjusted by means of a main valve unit mechanically coupled together with both the attaching part and the steering device in order to adjust the rotational damping of the steering device. The amount of hydraulic fluid flowing through the main valve unit is determined by a relative movement between the attaching part and the steering device. In other words, by means of the main valve unit being coupled together with both the attaching part and the steering device, an opening area of the main valve unit may be determined by a relative motion between the attaching part and the steering device such that the flow of the hydraulic fluid in a direction from and to the respective damping chamber of the steering damper is controlled depending on the cause of the rotational movement. Such a configuration may enable means for adjusting the rotational damping of a steering device in a vehicle such that the rotational damping varies depending on whether the rotational movement about the steering axis is caused by a force acting on the steering device of the vehicle or by a force acting on the part(s) of the vehicle contacting the ground. In other words, the device of the present invention may enable separating the damping in a steering damper of desired steering movements from undesired shocks caused by unevenness of the ground. This may be achieved by means of a substantially or completely mechanical arrangement. Thus, electronic components may not be required for achieving advantages of the present invention.

Other embodiments of the invention provide a device intended for a vehicle comprising: a steering device rotatable about a steering axis for adjusting the direction of the part(s) of the vehicle arranged for contacting the ground; a steering damper comprising a damping housing that encloses a main damping chamber which comprises hydraulic fluid and is partitioned into a first damping chamber and a second damping chamber by a delimiting part that is arranged in the main damping chamber and movable with respect to the damping housing; an attaching part that couples together the part(s) arranged for contacting the ground with the steering device and a steering damper, wherein the attaching part rotates with the steering device and any one of the damping housing and the delimiting part; and a main valve unit (HVU) adapted to adjust a flow of hydraulic fluid between the damping chambers of the steering damper. The main valve unit (HVU) is mechanically coupled together with both the attaching part and the steering device in order to adjust the rotational damping of the steering device, wherein the amount of hydraulic fluid flowing through the main valve unit (HVU) is determined by a relative movement between said attaching part and the steering device.

Certain embodiments of the invention provide a steering damper adapted to be arranged in a vehicle comprising a steering device rotatable about a steering axis for adjusting the direction of the part(s) of the vehicle arranged for contacting the ground and an attaching part that couples together the part(s) arranged for contacting the ground with the steering device. The steering damper comprises a damping housing and a main damping chamber defined by the damping housing. The main damping chamber comprises hydraulic fluid and is partitioned into a first and a second damping chamber. The steering device is mechanically connectable to the attaching part to enable rotation of the attaching part with the steering device and with the damping housing. A main valve unit is adapted to adjust a flow of hydraulic fluid between the damping chambers in order to adjust the rotational damping of the steering device, wherein the main valve unit can be mechanically coupled together with both the attaching part and the steering device. The steering damper is configured such that a relative movement between the attaching part and the steering device determines an amount of hydraulic fluid flowing through the main valve unit.

Certain embodiments of the invention provide a steering damper adapted to be arranged in a vehicle comprising a steering device rotatable about a steering axis for adjusting the direction of the part(s) of the vehicle arranged for contacting the ground and an attaching part that couples together the part(s) arranged for contacting the ground with the steering device. The steering damper comprises a damping housing and a main damping chamber defined by the damping housing. The main damping chamber comprises hydraulic fluid and is partitioned into a first and a second damping chamber by a delimiting part. The steering device is mechanically connectable to the attaching part to enable rotation of the attaching part with the steering device and with the delimiting part. A main valve unit is adapted to adjust a flow of hydraulic fluid between the damping chambers in order to adjust the rotational damping of the steering device, wherein the main valve unit can be mechanically coupled together with both the attaching part and the steering device. The steering damper is configured such that a relative movement between the attaching part and the steering device determines an amount of hydraulic fluid flowing through the main valve unit. In this manner, the amount of hydraulic fluid flowing through the main valve unit is determined by a relative movement between the attaching part and the steering device. Thus, according to an aspect of the invention, there is provided a steering damper adapted to be arranged in a vehicle comprising a steering device rotatable about a steering axis (SA) for adjusting the direction of the part(s) of the vehicle arranged for contacting the ground and an attaching part that couples together the part(s) arranged for contacting the ground with the steering device. The steering damper comprises a main damping chamber defined by a damping housing, said main damping chamber comprising hydraulic fluid and partitioned into a first and a second damping chamber. The steering device is mechanically connectable to said attaching part to enable rotation of said attaching part with said steering device and with any one of said damping housing and said delimiting part. A main valve unit (HVU) is adapted to adjust a flow of hydraulic fluid between the damping chambers in order to adjust the rotational damping of the steering device, wherein said main valve unit (HVU) can be mechanically coupled together with both the attaching part and the steering device, and wherein a relative movement between said attaching part and the steering device determines an amount of hydraulic fluid flowing through the main valve unit (HVU).

In some embodiments, the main damping chamber being defined by the damping housing may for example refer to an arrangement wherein the damping housing encloses the main damping chamber.

The main valve unit may be arranged integral with the steering device.

In certain embodiments, the steering device may be elastically coupled together with the attaching part. The relative movement between the attaching part and the steering device may, according to one example, occur only during a predetermined initial rotational movement of the steering device from a base position of the steering device.

It is understood that relative rotational movement between the attaching part and the steering device refers to relative movement about the steering axis or about another axis substantially parallel to the steering axis. The main valve unit may comprise a first and a second main valve.

In one embodiment, the device or the steering device may comprise a first main valve part and a second main valve part arranged in the first main valve and a third main valve part and a fourth main valve part arranged in the second main valve. The first main valve part may be coupled together with the steering device and the second main valve part may be coupled together with the damping housing of the steering damper. The third main valve part may be coupled together with the steering device and the fourth main valve part may be coupled together with the damping housing of the steering damper. The first and the second, and the third and the fourth main valve parts, respectively, may be moveable with respect to each other such that they form a first and a second variable opening area through which the hydraulic fluid can flow.

The opening area of the first main valve may decrease and the opening area of the second main valve may increase when the positions of the first and the second, and the third and the fourth main valve parts, respectively, relative to each other, are determined by a rotational motion in a first direction of the steering device or by a rotational motion in a second direction of the housing of the steering device.

The opening area of the first main valve may increase and the opening area of the second main valve may decrease when the positions of the first and the second, and the third and the fourth main valve parts, respectively, relative to each other, are determined by a rotational motion in a second direction of the steering device or by a rotational motion in a first direction of the housing of the steering device.

The opening area of the first main valve may increase and the opening area of the second main valve may decrease when the positions of the first and the second, and the third and the fourth main valve parts, respectively, relative to each other, are determined by a rotational motion in a second direction of the steering device or by a rotational motion in a first direction of the delimiting part of the steering damper.

The first and third main valve parts of the first and second main valve may move synchronously in relation to each other such that the opening area of the first main valve decreases substantially as much as the opening area of the second main valve increases, and vice versa.

The device or the steering device may comprise a first driver and a second driver, wherein the first main valve part may be coupled together with the steering device via the first driver and the third main valve part may be coupled together with the steering device via the second driver.

The first driver may be coupled together with the first main valve part by means of a first link and the second driver may be coupled together with the third main valve part by means of a second link, where the links are hinged at both ends.

The device or the steering device may comprise at least one spring element, wherein the first driver may be pressed against the first main valve part and the second driver may be pressed against the third main valve part by means of the at least one spring element.

The at least one spring element may be located between the first main valve part and the third main valve part such that the at least one spring element creates a pressing force acting on both valve parts.

In some embodiments, the device may furthermore comprise a valve actuator coupled together with the steering device for actuating the first and second main valves during relative movement between the steering device and the attaching part, thereby altering a first and a second variable opening area of the main valve. In other words, the valve actuator is moved in response to movement of the steering device when the valve actuator is coupled to the steering device. The valve actuator may refer to a pin, dowel, bolt or the like. The valve actuator may be coupled to the steering device by means of direct connection or may be coupled to the steering device via an intermediate element which may be attachment means arranged for clamping the steering device to the attaching part. The valve actuator may also refer to an extending portion of the steering device or an extending portion of the intermediate element being coupled to the steering device. Put differently, the valve actuator may be a mechanical element intended to affect the main valve unit upon relative movement between the steering device and the attaching part, i.e. when the steering device is turned or when the attaching part is rotated by force acting on the part(s) of the vehicle contacting the ground.

The device may furthermore comprise a valve actuator coupled together with the attaching part for actuating the first and second main valves during relative movement between the steering device and the attaching part, thereby altering a first and a second variable opening area of the main valve. In other words, the valve actuator is moved in response to movement of the attaching part when the valve actuator is coupled to the attaching part.

Put differently, the valve actuator may be a mechanical element intended to affect the main valve unit, in the sense that the hydraulic fluid flowing through the main valve unit is affected, upon relative movement between the steering device and the attaching part, i.e. when the steering device is turned or when the attaching part is rotated by force acting on the part(s) of the vehicle contacting the ground.

The opening area of the first main valve may decrease and the opening area of the second main valve may increase when the position of the valve actuator is determined by a rotational motion in a first direction of the steering device or by a rotational motion in a second direction of the attaching part. In other words, when the steering device is rotated in a first direction or when the attaching part is rotated in the opposite direction, the opening area of the first valve may decrease and the opening area of the second valve may increase.

The opening area of the first main valve may increase and the opening area of the second main valve may decrease when the position of the valve actuator is determined by a rotational motion in a second direction of the steering device or by a rotational motion in a first direction of the attaching part. In other words, when the steering device is rotated in a second direction or when the attaching part is rotated in the opposite direction, the opening area of the first valve may increase and the opening area of the second valve may decrease. The device or the steering device may comprise at least one holding-up means arranged between the attaching part and the steering device, the at least one holding-up means configured to determine the magnitude of the initial rotational motion.

The steering device may be coupled together with the attaching part via a torsion bar for allowing relative rotational movement between the steering device and the attaching part about a central axis of the torsion bar. It is understood that torsion bar refers to a metal element being substantially elastically twistable and that acts as a spring. The torsion bar may be arranged in parallel to the steering axis.

The central axis of the torsion bar may be arranged at a distance from the steering axis. In other words, the steering device rotates relative to the attaching part about the central axis of the torsion bar which is arranged at a distance from the steering axis.

The device may furthermore comprise at least two mechanical stops for limiting said relative movement between the attaching part and the steering device. Hereby it may be possible to avoid excessive rotational movement between the steering device and the attaching part which otherwise could result in a damages to the torsion bar. The two mechanical stops may refer to two mechanical elements such as two pins extending from the attaching part, thereby limiting the relative rotational movement. In other embodiments, the two mechanical stops may refer to mechanical devices involving at least two parts. The mechanical stops may interact with other portions of the attaching part or the steering device. The mechanical stops may refer to portions of an intermediate element such as attaching means for clamping the steering wheel to the attaching part.

The two mechanical stops may comprise at least one element slideably arranged in an opening between two surface portions thereof, such that the element is moveable between said surface portions in order to limit said relative movement to rotational movement. Therefore it may be possible to avoid damaging the torsion bar if, for example, force is applied to the steering device in directions other than the rotational direction. One such case may be during a motorcycle crash or during rough offroad driving. In one embodiment, an element is attached to one of the steering device and the attaching part and an opening is arranged in the other one of the steering device and the attaching part, in which opening the element is slideably arranged. The opening may be a hole, a slot, an aperture or the like. The opening may have dimensions relative to the element to achieve a play such that slideable operation is achieved. The element may have geometric properties such that axial relative movement between the steering device and the attaching part is limited. For example, the element may be shaped substantially as a bolt or screw, i.e. having a larger diameter in its one end. The attaching part may for example comprise a fork crown arranged at the front fork arrangement of a motorcycle.

The attaching part may comprise a cylindrical unit arranged around a steering connecting rod through which the steering axis runs.

The attaching part may be divided into an upper and a lower cylindrical part coupled together by means of an elastic holding-up means that is arranged to determine the magnitude of the initial rotational motion.

The device or the steering device may comprise a delimiting part arranged in the main damping chamber, in which the delimiting part is moveable with respect to the damping housing.

The steering damper may be a linear damping device in which the delimiting part is a piston attached to a piston rod for reciprocal movement within said damping chamber. The steering damper may be arranged at least partly inside the attaching part for achieving a compact installation. The piston rod may be hollow in order to achieve hydraulic fluid flow passages to the damping chambers.

The steering damper may be a rotational damping device, in which the delimiting part is a wing attached to a lever for reciprocal movement within said damping chamber. It is understood that lever refers to a mechanical element arranged for transferring rotational force to and from the wing. The rotational damping device may be of the type commonly referred to as a wing damper.

According to another embodiment of the present invention, there is provided a crown device adapted to be arranged in a vehicle comprising a steering device rotatable about a steering axis for adjusting the direction of the part(s) of the vehicle arranged for contacting the ground. The crown device comprises a steering damper, an attaching part and a main valve unit. The steering damper comprises a damping housing that encloses a main damping chamber which comprises hydraulic fluid and is partitioned into a first damping chamber and a second damping chamber by a delimiting part that is arranged in the main damping chamber and moveable with respect to the damping housing. The attaching part is adapted to couple together the part(s) arranged for contacting the ground with the steering device when the crown device is arranged in the vehicle. The attaching part is arranged to rotate with the steering device when the crown device is arranged in the vehicle. The main valve unit that is adapted to adjust a flow of hydraulic fluid between the damping chambers of the steering damper when the crown device is arranged in the vehicle. The main valve unit is coupled together with both the attaching part and the steering device when the crown device is arranged in the vehicle in order to adjust the rotational damping of the steering device. The amount of hydraulic fluid flowing through the main valve unit is determined by a relative movement between the attaching part and the steering device.

Thus, a relative movement is provided by allowing the steering device to move relative to the attaching part. Furthermore, by monitoring or measuring that relative movement between the steering device and the attaching part, the rotational damping of a steering device is adjustable such that the rotational damping varies depending on whether the rotational movement about a steering axis is caused by a force acting on the steering device of the vehicle or by a force acting on the part(s) of the vehicle contacting the ground.

The crown device may comprise attachment means adapted to couple the steering device together with the attaching part when the crown device is arranged in the vehicle, wherein the attachment means is arranged to allow relative movement between the attaching part and the steering device when the crown device is arranged in the vehicle. In other words, the attachment means may be an intermediate element between the attaching part and the steering device allowing relative movement between the attaching part and the steering device. Relative movement may be realized between the attaching part and the attachment means, i.e. when the steering device is fixed to the attachment means. Alternatively, relative movement may be realized between the steering device and the attachment means, i.e. when the attaching part is fixed to the attachment means.

The attachment means may be adapted to elastically couple the steering device together with the attaching part when the crown device is arranged in the vehicle, wherein the attachment means is arranged to elastically allow relative movement between the attaching part and the steering device when the crown device is arranged in the vehicle.

The main valve unit may be mechanically coupled together with both the attaching part and the steering device in order to adjust the rotational damping of the steering device. Thus, a mechanical crown device may be achieved which may not require electronics to achieve actuation of the main valve unit.

The crown device may furthermore comprise an electronic sensor adapted to measure said relative movement between the attaching part and the steering device. Thus, the relative movement may be measured electronically and the steering damper may be controlled in a customized manner by, for example, an electronic control unit (ECU). Using an electronic sensor may also be advantageous when compared to a mechanical actuating mechanism from a friction perspective.

The electronic sensor may be selected from a group of sensors comprising a potentiometer, a hall effect sensor, and an optical sensor.

The electronic sensor may be arranged to measure the magnitude and the direction of the relative movement between the attaching part and the steering device when the crown device is arranged in the vehicle. This may be advantageous because the additional information provided by the electronic sensor, i.e. magnitude and direction, may be used to achieve improved control of the steering damper. Further objects and advantages of the various embodiments of the present invention will be described below by means of exemplifying embodiments.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION OF THE PREFERRED EMBODIMENT

The present invention will now be described more fully hereinafter with reference to the accompanying drawings, in which exemplifying embodiments of the invention are shown. This invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to like or similar elements throughout.

Figure 1:
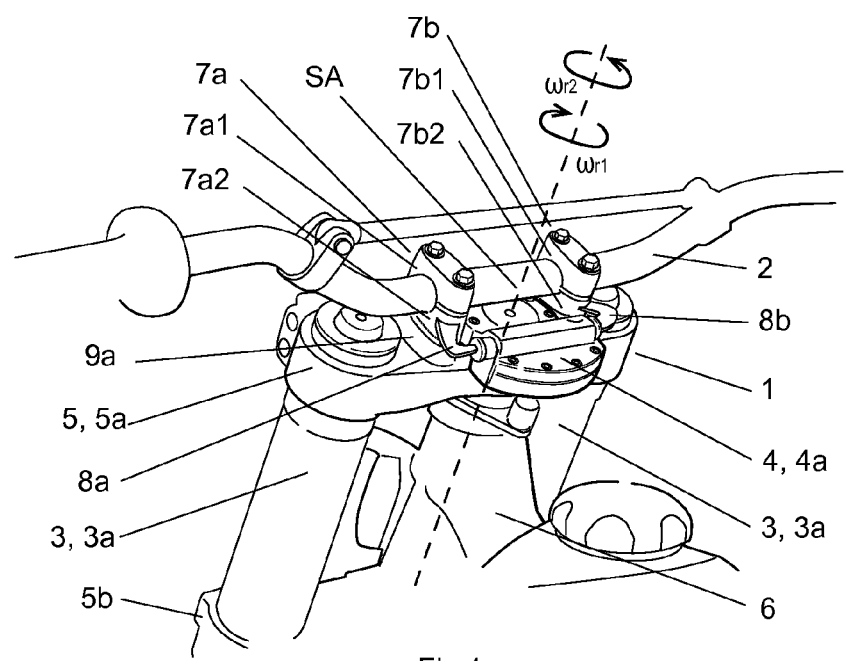
FIG. 1 is a view of a first embodiment of the present invention where the invention is arranged on a motorcycle.

FIG. 1 is a view of an embodiment of the present invention where the invention is arranged on a vehicle in the form of a motorcycle having two parts 3 contacting the ground—one front wheel (not shown) coupled together with the chassis by means of a front fork having two fork legs 3a and a back wheel attached in the chassis by means of a swing arm (not shown).

Another embodiment of the invention may include three wheels on this type of vehicle. The joining of the front fork legs 3a of the motorcycle and the motorcycle frame's front chassis 6 takes place by means of one or several attaching parts 5 which in this case have the shape of fork crowns 5a, 5b. The fork crowns 5a, 5b are rotatable about a steering axis SA centered in a steering column 6 extending through both of the fork crowns 5a, 5b. The front wheel (not shown) of the motorcycle is located between the right fork leg and the symmetrically located left fork leg 3a such that rotation of front wheel, fork crowns 5a, 5b and fork legs 3a takes place about the steering axis SA. A steering device in the form of a handlebar 2 is attached in the upper fork crown 5a by means of a first 7a and second 7b attachment means. The attachment means 7a, 7b comprise two parts; an upper 7a1, 7b1 and a lower 7a2, 7b2, between which the handlebar 2 is clamped.

In addition to a handlebar, a steering wheel may also be used as steering device 2 for adjusting the direction of the vehicle's part(s) 3 contacting the ground. In FIGS. 1 and 8a-8c the rotational movement of the steering device is shown by the arrows marked with $\omega_{r1}$, $\omega_{r2}$. When the vehicle is advanced straight forward, the steering device can be thought of to be in a base position in which the handlebar or the steering wheel is set such that the vehicle's part(s) 3 contacting the ground are parallel with the direction of travel when no forces act on the wheel.

In FIG. 1 a steering damper 4 is mounted below the handlebar 2 between the attachment means 7a, 7b and attached to the upper 5a of the fork crowns 5. The steering damper 4 is coupled together with the lower part 7a2, 7b2 of the respective attachment means by means of a first and a second driver 11a, 11b. The steering damper 4 can also be mounted above the handlebar or at another position in proximity of the handlebar.

Figure 2:
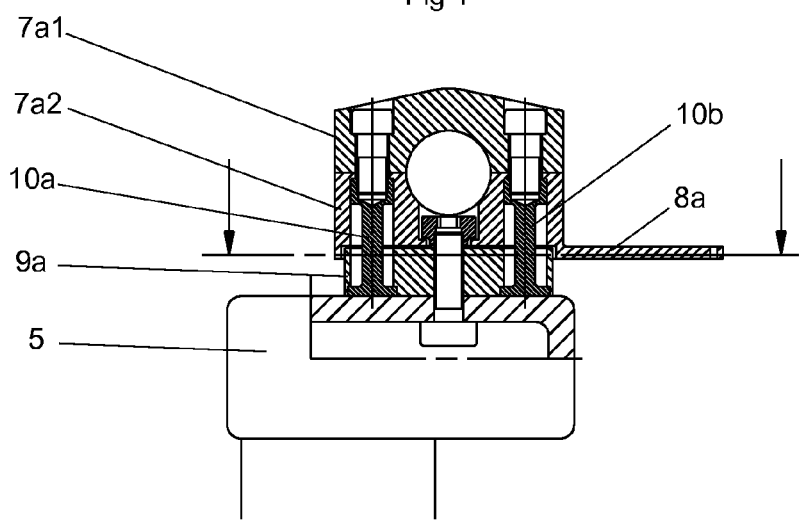
FIG. 2 is a sectional view of one of the attachment means.

In FIG. 2 there is shown a sectional view of one of the attachment means 7a. Preferably both of the attachment means 7a, 7b are constructed in the same manner. A third attachment part 9a, 9b is arranged in the attaching part 5 that couples together the attachment means 7a, 7b and the attaching part 5. Between the lower attachments means part 7a2, 7b2 and the third attachment part 9a, 9b holding-up means 10a, 10b are arranged. These holding-up means 10a, 10b are constructed such that they are elastic in the direction of rotation such that the lower attachment means part 7a2, 7b2 can rotate with an initial rotational movement with respect to the third attachment part 9a, 9b. The third attachment part 9a, 9b can be omitted and then the lower attachment means part 7a2, 7b2 is instead elastically attached directly in the attaching part 5 via the holding up-means 10a, 10b. Drivers 8a, 8b extend from the lower attachment part 7a2, 7b2. Drivers 8a, 8b may be made of the same material or be a separate unit attached in the lower attachment part.

Figure 3A:
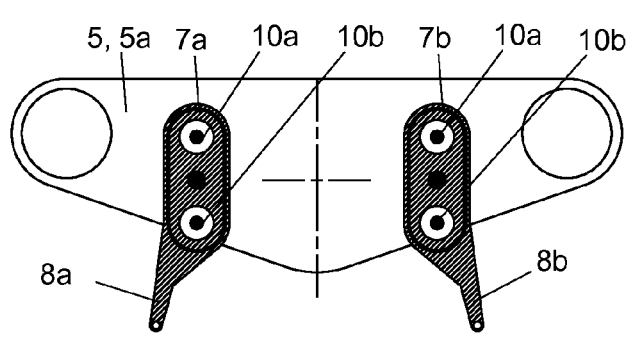
FIGS. 3a and 3b show an embodiment in which the holding-up means is arranged in the attachment means.
Figure 3B:
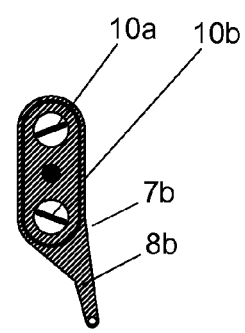

The holding-up means 10a, 10b can also be constructed such that they are more elastic when rotated compared to when bent. The holding-up means 10a, 10b can in that case be arranged in the attachment means in the manner shown in FIG. 3a. The holding-up means in that case have a waist, meaning that the central portion of the holding-up means is tapered. The tapering preferably is radially symmetric around the entire holding-up means, FIG. 3a, or mainly in a lateral direction, FIG. 3b, such that the pliancy of the holding-up means depends on how the holding-up means are mounted in the attachment means 7a, 7b. Thus, the lower attachment means part 7a2, 7b2, with which the handlebar 2 is coupled together, can to a larger degree be moved rotationally compared to horizontally with respect to the third attachment part 9a, 9b. In other words, the attachments means part 7a2, 7b2 and the third attachment part 9a, 9b may rotate in relation to each other within an initial rotational movement, but when the driver causes a force on the handlebar 2 in the direction of movement of the vehicle the coupling is mainly inelastic. Because the steering device 2 is elastically coupled together with the attaching part 5, rotation of the steering device 2 about the steering axis SA begins only after a predetermined initial rotational movement from the base position of the steering device has taken place.

Figure 4:
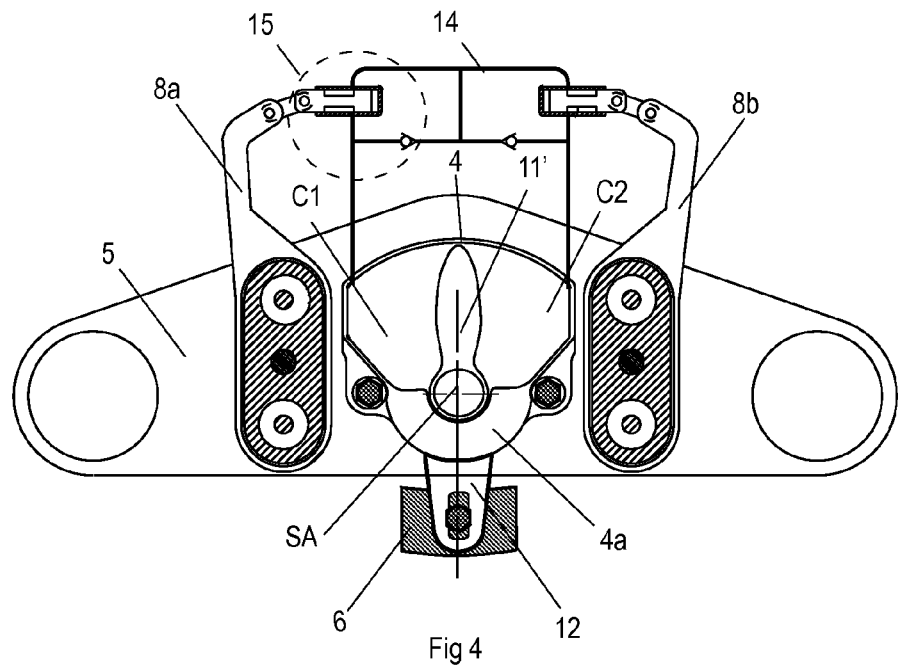
FIG. 4 is a sectional view through an embodiment of a steering damper.
Figure 5:
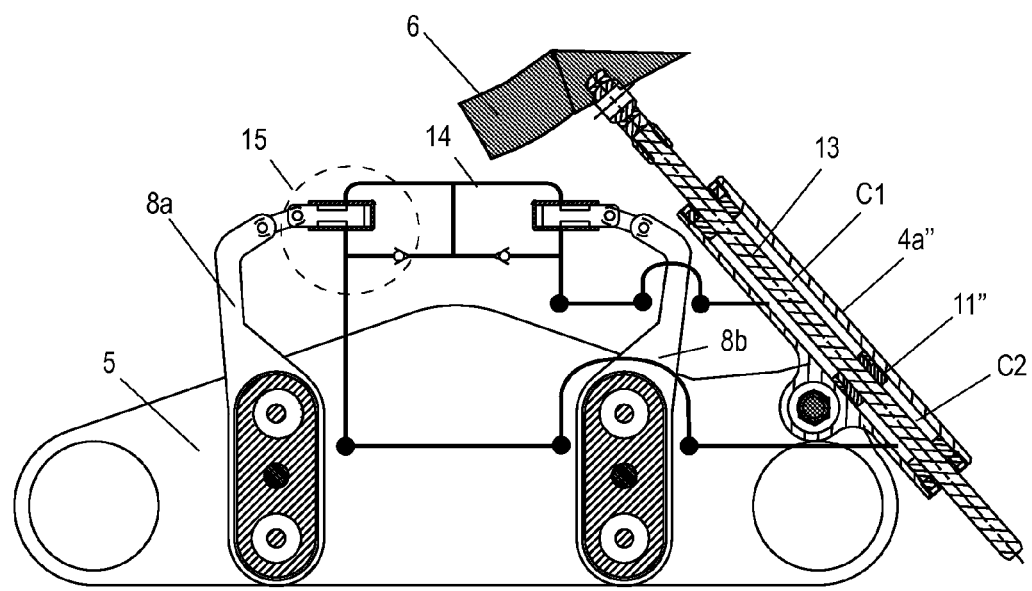
FIG. 5 is a sectional view through another embodiment of a steering damper.

Additional embodiments of a steering damper having an inner moveable delimiting part 11 are described in more detail in FIGS. 4 and 5.

FIG. 4 is a sectional view through an embodiment of a steering damper, a rotational steering damper, comprising an outer damping housing 4a enclosing a main damping chamber comprising hydraulic fluid that is partitioned into two damping chambers C1, C2 by means of a delimiting part 11 in the form of a wing 11'. The wing 11' is rotatable about the steering axis SA at a first wing end. The main damping chamber may be filled with hydraulic fluid. The hydraulic fluid preferably comprises oil, possibly comprising various additives. The outer surface of the wing end rotates in a custom-made cut-out in the housing 4a. In the first wing end there is also attached a lever 12. The lever 12 rotates with the wing 11' in relation to the outer housing 4a and it is according to known techniques intended to couple together the steering damper 4, which rotates in relation to the steering device 2, with the frame/chassis 6 of the vehicle. By means of this fixture the movement of the attaching part 5 in the damping chamber mainly becomes related to the movement of the handlebar 2 and the wing 11' in relation to the frame 6 of the vehicle. It is also possible to attach the housing 4a of the steering damper in the chassis/frame 6 and couple together the wing 11' with the attaching part 5, which rotates in relation to the handlebar 2, and achieve the same function.

FIG. 5 shows another embodiment of a steering damper, a linear steering damper, comprising an outer, cylindrically shaped housing 4a" partitioned into two damping chambers C1, C2 by means of a delimiting part in the form of a piston 11" attached to a piston rod 13. The piston rod 13 may either extend through the whole of the cylindrically shaped housing 4a" or be arranged on a side of the piston 11". The steering damper housing 4a" is coupled together with any of the attaching parts 5 rotating about the steering axis SA which, together with the handlebar 2 and the piston bar 13, is coupled together with the chassis/frame 6, or vice versa.

In both embodiments shown in FIGS. 4 and 5 the relative motion between the parts rotating about the steering axis SA and the chassis is damped by the delimiting part 11 moving in relation to the steering damper housing 4 and pressing hydraulic fluid through one or several channels 14. The channel 14 is preferably arranged as a hole in the damping housing 4a and delimited by a valve arrangement 15.

Figure 6:
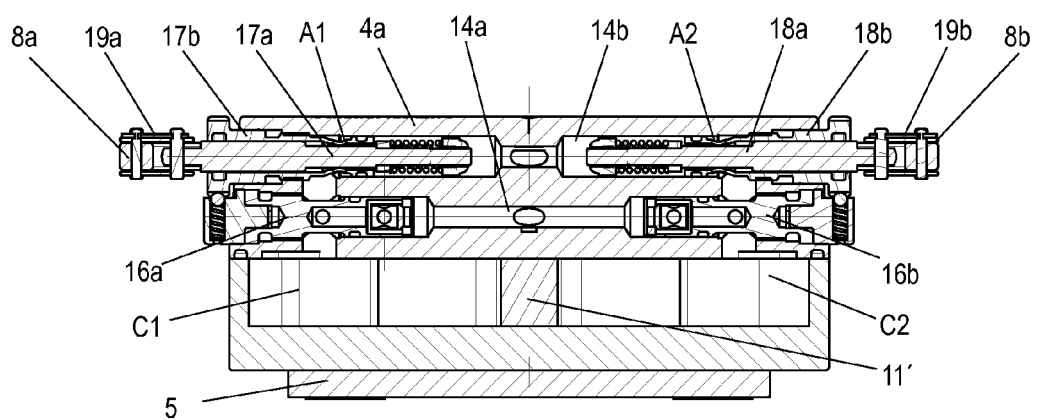
FIG. 6 shows an embodiment of the valve arrangement.

The valve arrangement 15 is shown in detail in FIG. 6 and comprises at least one non-return valve 16. In this embodiment two non-return valves 16a, 16b, and a main valve unit HVU comprising one or several main valves 17, 18 mechanically coupled together with both the attaching part 5 and the steering device 2 are shown.

The first main valve comprises a first main valve part 17a and a second main valve part 17b. The first main valve part 17a is closely coupled together with the steering device 2 via a first link 19a to the first driver 8a and the second main valve part 17b is closely coupled together with the attaching part 5 via the damping housing 4a of the steering damper. The second main valve comprises a third main valve part 18a and a fourth main valve part 18b. The third main valve part 18a is, via a second link, closely coupled together with the steering device by means of the second driver 8b and the fourth main valve part 18b is closely coupled together with the attaching part 5 via the damping housing 4a of the steering damper. The first and the second main valve parts 17a, 17b and the third and the fourth main valve parts 18a, 18b, respectively, move relative to each other during the initial rotational movement. This creates a first and a second variable opening area A1, A2 through which the hydraulic fluid can flow when a pressure difference between the damping chambers C1, C2 is present and when no disturbance acts in a direction that is reverse to the intentional rotational movement of the steering means. By means of coordinated effect on the main valves' first and third valve parts 17a, 18a by respective adjustment devices, the opening area A1 of the first main valve 17 decreases while the opening area A2 of the second main valve 18 at the same time increases, and vice versa. An adjustment in the opening area results in that control of the flow of hydraulic fluid from and to the respective damping chamber C1, C2 of the steering damper is enabled and eventually completely flowing freely or being brought to a stop when the initial rotation has been finished.

Figure 7:
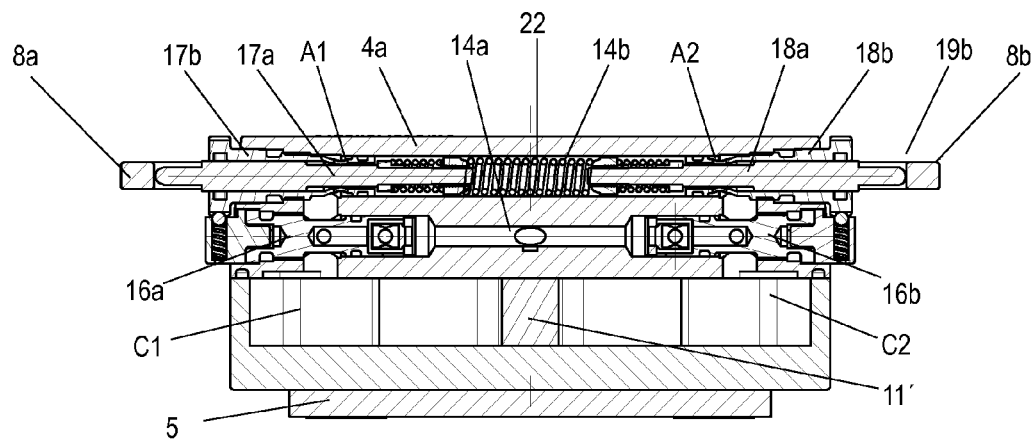
FIG. 7 shows another embodiment of the valve arrangement.

In FIG. 7 there is shown an alternative embodiment of the valve arrangement 15. In this case the link 19a, 19b that couples together the drivers 8a, 8b and the first and the third main valve part 17a, 18a has been removed and replaced by one or several spring elements 22. The end of the first and the third main valve part 17a, 18a facing the respective driver 8a, 8b has a semispherical configuration in order to be able to accommodate certain lateral movements. The spring element 22 is located between the first main valve part 17a and the third main valve part 18a so that the spring element creates a pressing force on both of the valve parts 17a, 18a and ensures that the first and the third main valve part 17a, 18a is pressed against the driver 8a, 8b with no play. Other than that, the valve arrangement in FIG. 7 is substantially identical to the valve arrangement in FIG. 6.

Figure 8:
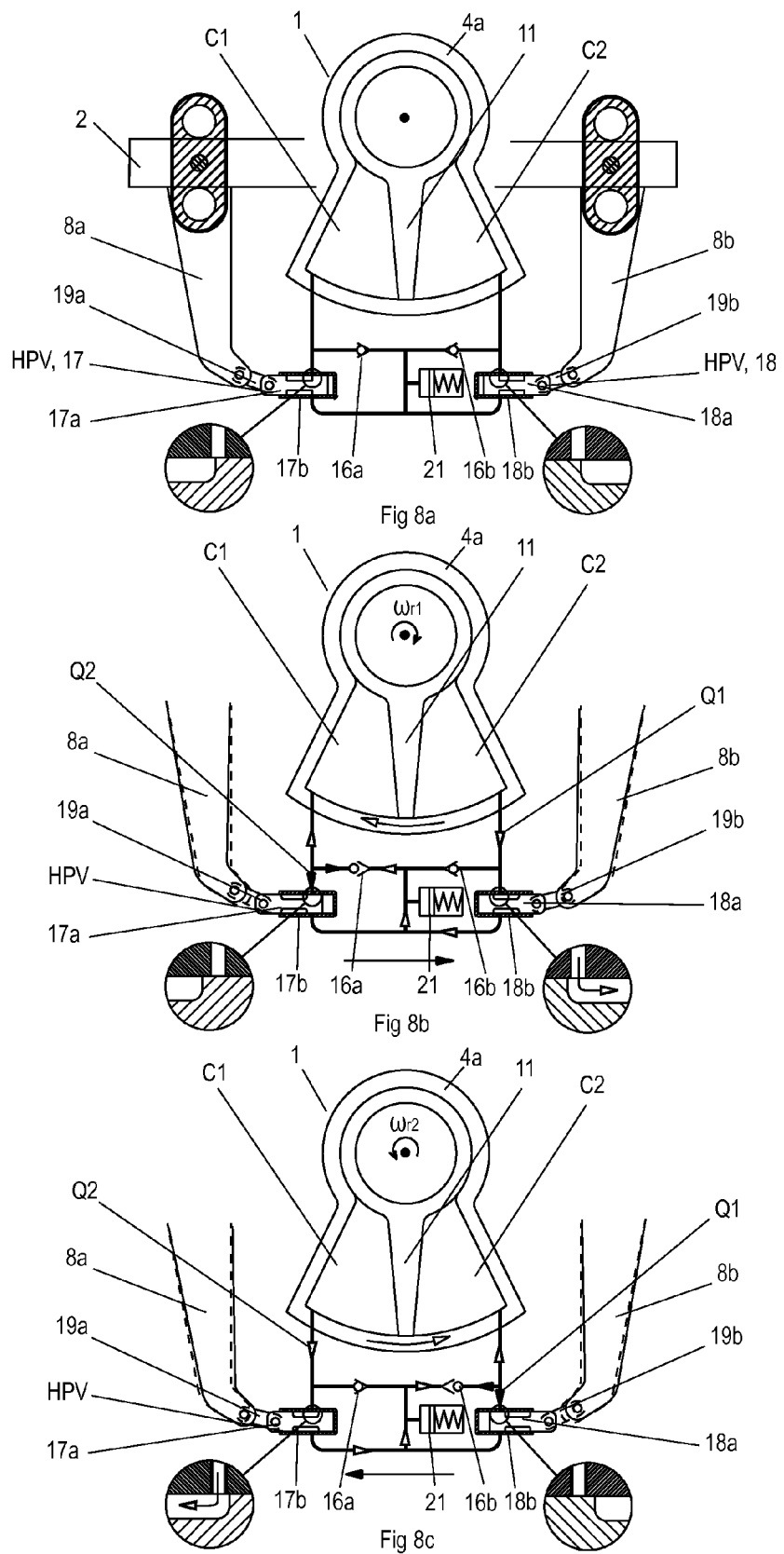
FIG. 8a shows the function of the steering damper when the vehicle is driven straight forward and no disturbances act on the steering means.
FIG. 8b shows the function of the steering damper when the driver actively steers to the right or when a disturbance acts on the steering means from the left.
FIG. 8c shows the function of the steering damper when the driver actively steers to the left or when a disturbance acts on the steering means from the right.

In FIGS. 8a-8c the function of the steering damper is described in more detail. In all of the figures the damping chambers C1, C2 are hydraulically coupled together by means of the damping channel 14 and the flow between the chambers is delimited by the main valves HPV, i.e. 17, 18, and blocked by non-return valves 16a, 16b. The non-return valves 16a, 16b are positioned in series with the main valves in the damping channel 15 and prevent flow in the respective flow direction Q1, Q2, which is determined by the rotational direction of the steering damper. According to a known construction, a pressurization reservoir 21 can be positioned in series with the main valves and the non-return valves. The pressurization reservoir ensures that at least a base pressure always is present in the damping chambers C1, C2 and that volume changes in the hydraulic fluid can be absorbed. The pressurization reservoir 21 is located such that if there is a higher pressure in the pressurization reservoir than in the damping chambers the reservoir 21 is always coupled together with respective damping chambers via the non-return valves 20a, 20b.

FIG. 8a shows the function of the steering damper when the vehicle is driven straight forward and no disturbances act on the steering means 2 that are neither caused by the driver nor the configuration of the ground. The moveable delimiting part 11 of the steering damper is located such that the damping chambers are basically equally large. The opening between the first and the second valve part is open and a flow of hydraulic fluid can run between the damping chambers C1, C2 via the main valves 17, 18.

FIG. 8*b* shows the function of the steering damper when the driver is actively steering to the right, i.e. in the first direction $\omega_{r1}$. The damping housing 4*a* is turned with the handlebar 2 to the left in the figure in relation to the delimiting part 11 so that the volume of the second damping chamber C2 decreases. The possible initial rotation between the handlebar 2 and the attaching part 5 results in the drivers 8*a*, 8*b* affecting the main valves such that the first main valve 17 closes and the second main valve 18 opens. The hydraulic fluid flows between the damping chambers C2 and C1 in the direction Q1 via the channel 14 (see the black/white arrow) and through the completely open opening between the third and fourth main valve parts 18*a*, 18*b* of the second main valve 18. When a disturbance S1 that causes the wheel to turn to the left acts on the wheel, the flow Q2 of hydraulic fluid through the channel 14 (see the completely black arrow) is stopped both by the completely closed first main valve 17 and the first non-return valve 16*a*.

FIG. 8*c* shows the function of the steering damper when the driver is actively steering to the left or when a disturbance acts on the steering means from the right, i.e. in the second direction $\omega_{r2}$. The damping housing 4*a* is turned with the handlebar 2 to the right in the figure in relation to the delimiting part 11 so that the volume of the first damping chamber C1 decreases. In this case, the initial rotation results in the drivers 8*a*, 8*b* affecting the main valves such that the second main valve 18 closes and the first main valve 17 opens. The hydraulic fluid flows between the damping chambers C1 and C2 in the direction Q2 (see the completely black arrow) via the channel 14 and through the completely open opening between the first and second main valve parts 17*a*, 17*b* of the first main valve 17. When a disturbance S2 that causes the wheel to turn to the right acts on the wheel, the flow Q1 of hydraulic fluid through the channel 14 (see the black/white arrow) is stopped both by the completely closed second main valve 18 and the second non-return valve 16*b*.

When the first and the second main valves 17, 18, respectively, are open, i.e. when the turning motion of the handlebar is caused by the driver, the hydraulic fluid basically flows freely between the damping chambers with no restriction and no damping of the steering motion takes place but the vehicle reacts just as quickly as if no steering damper was mounted. If a certain amount of damping is also desired when steering it may be achieved by an adjustment of the position of the first and second main valve parts 17*a*, 17*b*; 18*a*, 18*b* relative to each other. When shocks and impacts causes the wheel to be turned against the driver's will the motion of the handlebar is blocked or strongly damped in the undesired turning direction as the main valves 17, 18 in that direction are closed and the flow between the damping chambers is prevented.

Figure 9:
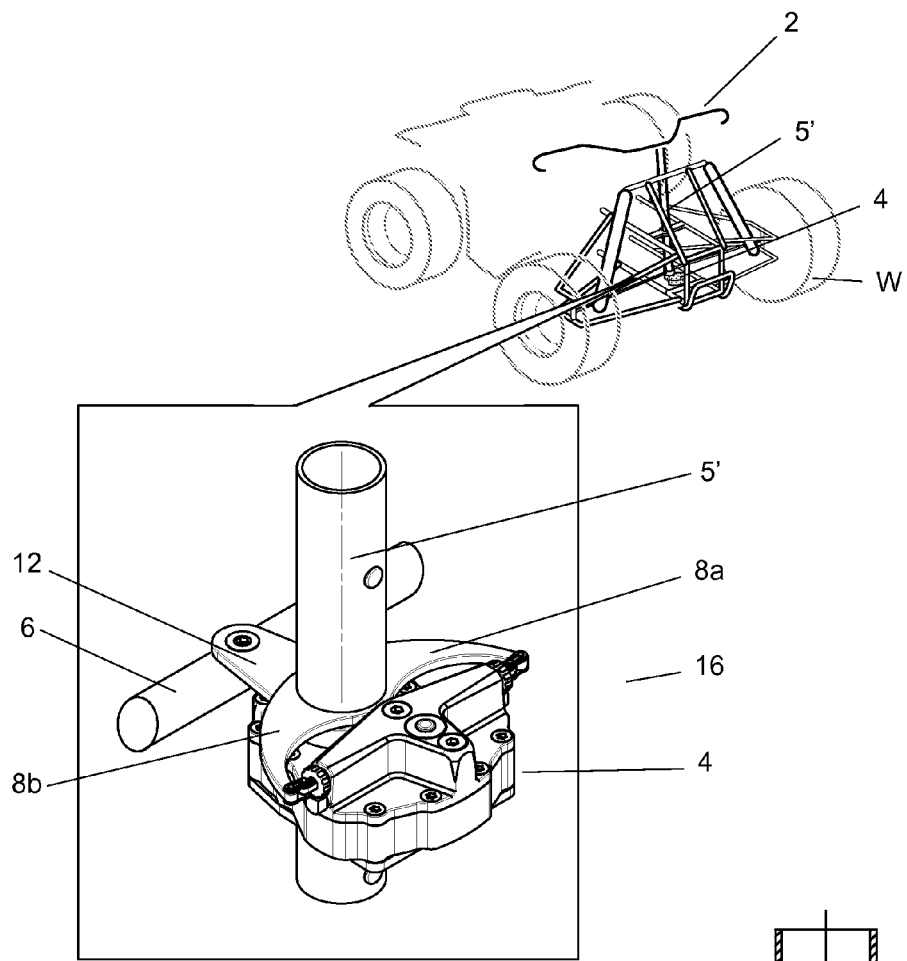
FIG. 9 is a view of an embodiment of the steering damper according to the present invention arranged on a four-wheeled ATV.
Figure 10:
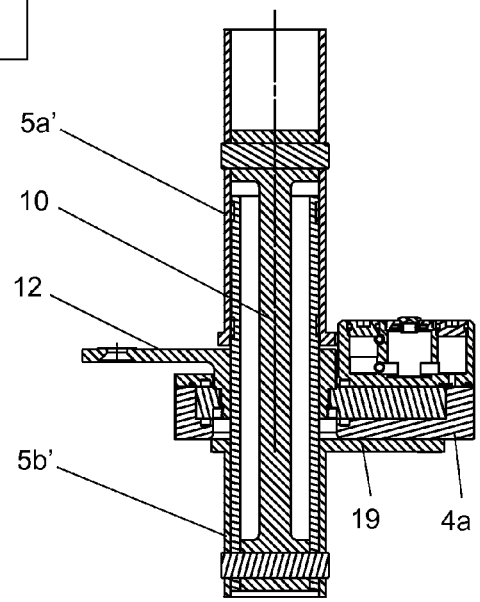
FIG. 10 is a sectional view of the steering damper mounted on an ATV.

FIG. 9 shows the location of the steering damper on a four-wheeled ATV. In this case the damping housing is fixed to an attaching part 5 in the form of a cylinder 5' arranged concentrically around the steering axis. The cylinder 5' is divided into an upper and a lower part 5*a'*, 5*b'* coupled together by means of an elastic holding-up means 10. The upper cylinder part 5*a'* is coupled together with the steering device 2, and the lower cylinder part 5*b'* is coupled together with the wheels 3 via one or several wheel suspension parts. In this embodiment the steering damper 4 is mounted in the lower cylinder part 5*b'* but the steering damper can also be mounted in the upper cylinder part 5*a'*. The steering damper housing 4*a* is fixed to a flange 19 protruding from the cylinder part, and hence moves together with the lower cylinder part 5*b'*. In this case, the delimiting part 8 that is moveable in the damping housing is coupled together with the fixed chassis parts 6 of the vehicle via the lever 12 so that the delimiting part 8 and the damping housing 4*a* move in relation to each other. Of course, a linear steering damper such as the one shown in FIG. 5 can also be used in ATV applications.

Figure 11:
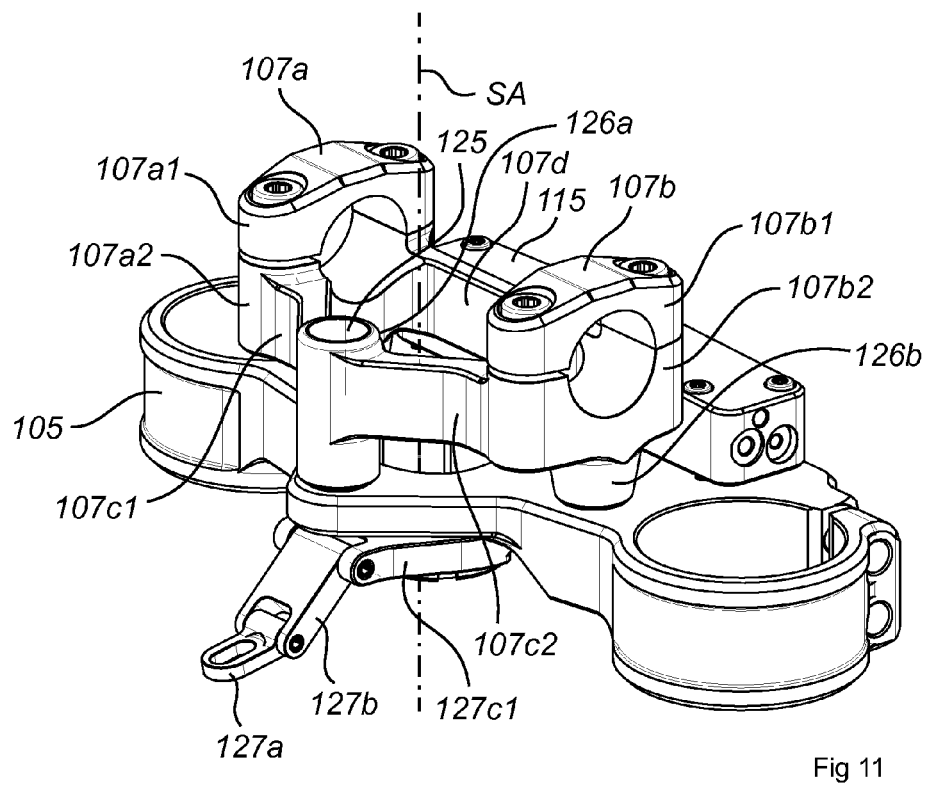
FIG. 11 is a view of an embodiment of the device comprising a torsion bar.

FIG. 11 shows a view of an embodiment of the present invention suitable for use on a motorcycle, for example. The attaching part 105 in this embodiment has the shape of a fork crown. The fork crown is of the triple clamp type which means that two front forks are attachable to the fork crown at either ends and a steering column is attachable in between said front forks. The fork crown 105 is rotatable about a steering axis SA, coinciding with the axis of a steering column when attached thereto. A steering device in the form of a handlebar is attachable in the fork crown 105 by means of a first attachment means 107*a* and second attachment means 107*b*. The attachment means 107*a*, 107*b* comprise two parts: an upper 107*a*1, 107*b*1 and a lower 107*a*2, 107*b*2, between which a handlebar is clampable. The attachment means 107*a*, 107*b* are coupled together via bars 107*c*, 107*d*. The first bar, 107*c* is divided into two parts, 107*c*1, 107*c*2 between which a torsion bar 125 is disposed. The torsion bar 125 is attached in its upper end to the first bar 107*c* and in its lower end to the fork crown 105. The attachment means 107*a*, 107*b* are attached to the fork crown 105 via two elements 126*a*, 126*b*. The elements are slideably arranged in openings in the fork crown between two end surfaces of the openings, i.e. the elements are slideably arranged between two end positions defined by these end surfaces. The openings are larger in size relative to the elements, thereby allowing a slideable operation. In other embodiments, the elements are arranged in slots or holes in the fork crown. The elements are attached to the fork crown and the attaching part. Thus, the attachment means are limited to rotational movement relative to the fork crown. On top of the fork crown 105 adjacent to the attachment means 107*a*, 107*b*, a main valve unit 115 is arranged.

Figure 12:
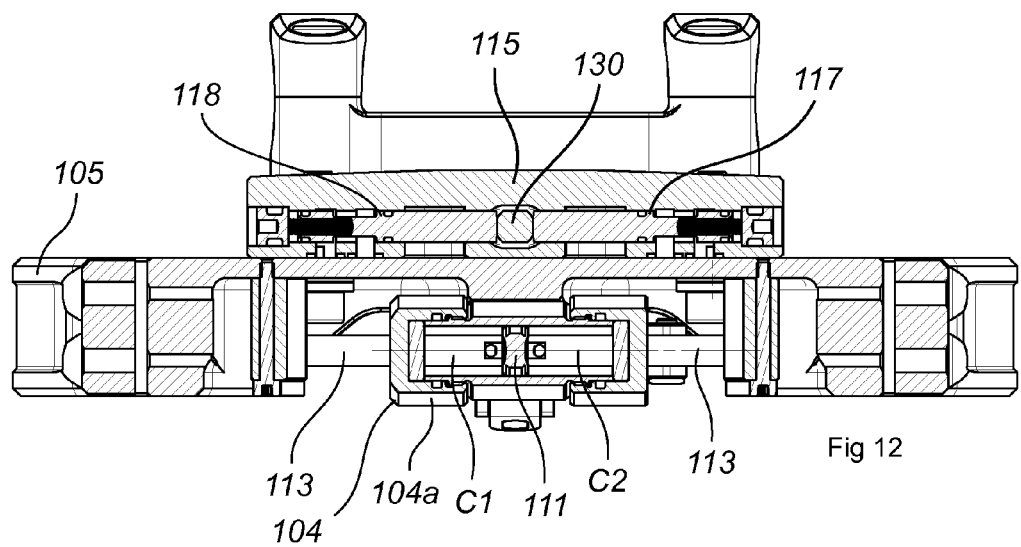
FIG. 12 is a sectional view of the steering damper in FIG. 11.

FIG. 12 shows a sectional view of the device in FIG. 11. The sectional view is shown along a cross section of the main valve unit 115 and the steering damper 104. The main valve unit 115 is arranged on top of the fork crown 105 and the steering damper 104 is arranged substantially in parallel with the main valve unit 115 mostly inside the fork crown 105, extending partly through the bottom of the fork crown. The main valve unit 115 comprises a first and a second valve unit 117, 118. A valve actuator 130, coupled to the attachment means 107*a*, 107*b* via the bar 107*d*, extends into the main valve unit 115. The steering damper 104 is of the linear damping type comprising a piston 111 that partitions the interior of the damping housing 104*a*, i.e. the damping chamber, into two damping chambers C1 and C2. The piston 11 is attached to a piston rod 113 which extends through the steering damper 104. The piston rod 113 is attached in both ends to the fork crown. In other embodiments, the piston rod may be attached in one end only.

Figure 13:
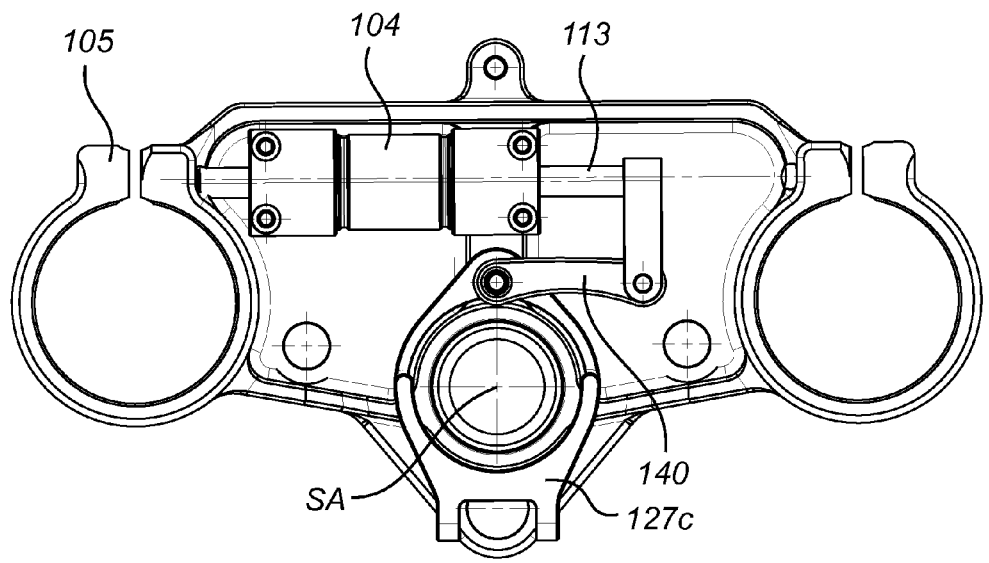
FIG. 13 is a view of an embodiment of the device comprising a linear steering damper.

FIG. 13 shows a view from beneath of an embodiment of the present invention. The attaching part is in the form of a fork crown 105. The housing of the linear steering damper 104 is attached to the fork crown, and the piston rod 113 is coupled via a link bar 140 to the rotating link 127*c* which in turn is attachable to the frame of the vehicle when mounted thereto.

Figure 14:
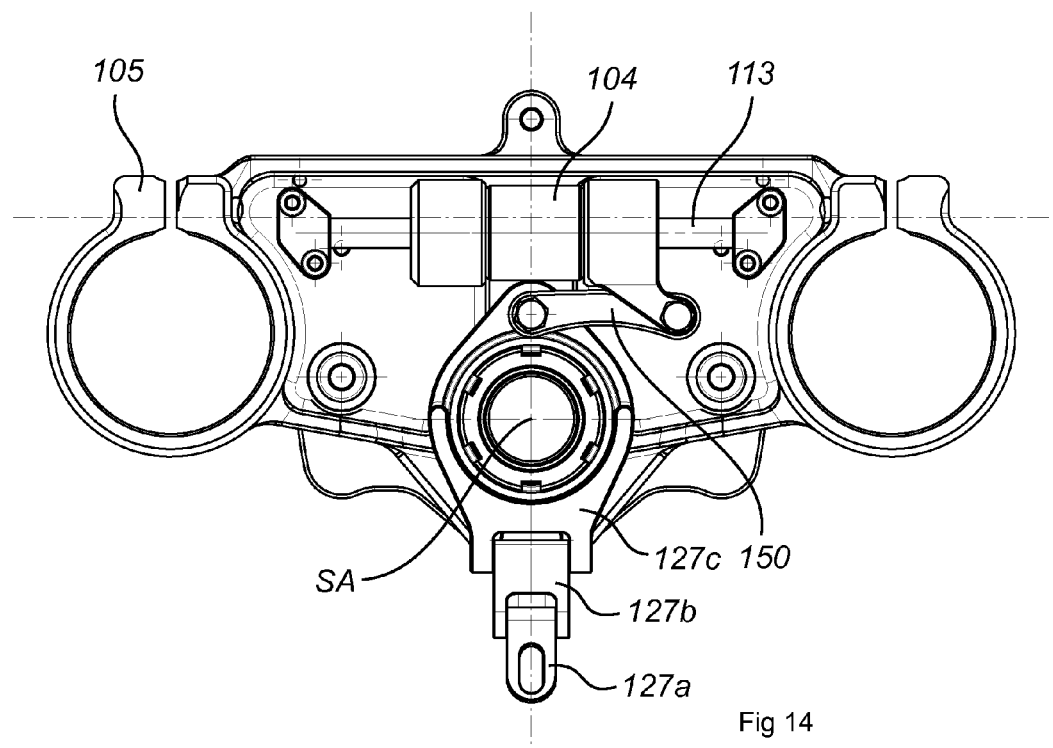
FIG. 14 is a view of another embodiment of the device comprising a linear steering damper.

FIG. 14 shows a view from beneath of an embodiment of the present invention. The attaching part is in the form of a fork crown 105. The housing of the linear steering damper 104 is coupled via a link bar 140 to the rotating link 127*c* which in turn is attachable to the frame of the vehicle via the links 127*a*, 127*b* when mounted thereto. The piston rod 113 extends through the steering damper 104, and the piston rod is attached in both ends to the fork crown 105.

In summary, a device is disclosed for adjusting the rotational damping of a steering device in a vehicle such that the rotational damping varies depending on whether the rotational motion about a steering axis is caused by a force acting on the steering device of the vehicle or a force acting on the part(s) of the vehicle contacting the ground. The device comprises a steering damper comprising a damping housing enclosing a main chamber which comprises hydraulic fluid and is partitioned into a first and a second damping chamber, for example by a delimiting part moveable in relation to the damping housing. The damping housing is fixed on an attaching part that couples together the part(s) of the vehicle contacting the ground with the steering device. The present invention is characterized in that the flow of hydraulic fluid in the steering damper partly or wholly is adjusted by a main valve unit that is coupled together with both the attaching part and the steering device. By means of this coupling the opening area of the main valve unit is determined by a relative motion between the attaching part and the steering device such that the flow of the hydraulic fluid in a direction from and to the respective damping chamber of the steering damper is controlled depending on the cause of the rotational movement.

Although exemplary embodiments of the present invention have been described herein, it should be apparent to those having ordinary skill in the art that a number of changes, modifications or alterations to the invention as described herein may be made. Thus, the above description of the various embodiments of the present invention and the accompanying drawings are to be regarded as non-limiting examples of the invention and the scope of protection is defined by the appended claims. Any reference signs in the claims should not be construed as limiting the scope.

The invention claimed is:

1. A device intended for a vehicle comprising:
   a steering device rotatable about a steering axis for adjusting a direction of one or more part(s) of the vehicle that are arranged for ground contact;
   a damping housing of a steering damper that encloses a main damping chamber that is adapted to contain hydraulic fluid and that is partitioned into a first damping chamber and a second damping chamber;
   an attaching part that couples the steering device and the one or more part(s) arranged for ground contact; and
   a steering damper, wherein the attaching part rotates with the steering device and with the damping housing, and wherein a main valve unit is configured to adjust a flow of hydraulic fluid between the first damping chamber and the second damping chamber of the steering damper, the main valve unit is mechanically coupled together with both the attaching part and the steering device in order to adjust the rotational damping of the steering device and wherein an amount of hydraulic fluid flowing through the main valve unit is determined by a relative movement between the attaching part and the steering device.

2. The device of claim 1, wherein the steering device is elastically coupled with the attaching part.

3. The device of claim 2, wherein the relative movement between the attaching part and the steering device occurs only during a predetermined initial rotational movement of the steering device from a base position.

4. The device of claim 3, wherein the main valve unit comprises a first and a second main valve.

5. The device of claim 4 further comprising a first main valve part and a second main valve part arranged in the first main valve, wherein the first main valve part is coupled together with the steering device and the second main valve part is coupled together with the damping housing of the steering damper, the device further comprising a third main valve part and a fourth main valve part arranged in the second main valve, wherein the third main valve part is coupled together with the steering device and the fourth main valve part is coupled together with the damping housing of the steering damper, wherein the first and the second and the third and the fourth main valve parts, respectively, are moveable with respect to each other such that they form a first and a second variable opening area through which the hydraulic fluid can flow.

6. The device of claim 5, wherein the opening area of the first main valve decreases and the opening area of the second main valve increases when the positions relative to each other of the first and the second, and the third and the fourth main valve parts, respectively, are determined by a rotational motion in a first direction of the steering device or by a rotational motion in a second direction of the housing of the steering device, and wherein the opening area of the first main valve increases and the opening area of the second main valve decreases when the positions relative to each other of the first and the second and the third and the fourth main valve parts, respectively, are determined by a rotational motion in a second direction of the steering device or by a rotational motion in a first direction of the housing of the steering device.

7. The device of claim 4 further comprising a valve actuator coupled together with the steering device for actuating the first and second main valves during relative movement between the steering device and the attaching part thereby altering a first and a second variable opening area of the main valve.

8. The device of claim 4 further comprising a valve actuator coupled together with the attaching part for actuating the first and second main valves during relative movement between the steering device and the attaching part thereby altering a first and a second variable opening area of the main valve.

9. The device of claim 4 further comprising a delimiting part arranged in the main damping chamber and moveable with respect to the damping housing.

10. A device intended for a vehicle comprising:
    a steering device rotatable about a steering axis for adjusting a direction of one or more part(s) of the vehicle that are arranged for ground contacting;
    an attaching part that couples together the steering device and the one or more part(s) that are arranged for ground contact; and
    a steering damper comprising a delimiting part that partitions a main damping chamber that is adapted to contain hydraulic fluid and that is partitioned into a first damping chamber and a second damping chamber, wherein the attaching part rotates with the steering device and with the delimiting part, wherein a main valve unit is configured to adjust a flow of hydraulic fluid between the first damping chamber and the second damping chamber of the steering damper, the main valve unit is mechanically coupled together with both the attaching part and the steering device in order to adjust the rotational damping of the steering device, and wherein an amount of hydraulic fluid flowing through the main valve unit is determined by a relative movement between the attaching part and the steering device.

11. The device of claim 10, wherein the steering device is elastically coupled with the attaching part.

12. The device of claim 11, wherein the relative movement between the attaching part and the steering device occurs only during a predetermined initial rotational movement of the steering device from a base position.

13. The device of claim 12, wherein the main valve unit comprises a first and a second main valve.

14. The device of claim 13 further comprising a first main valve part and a second main valve part arranged in the first main valve, wherein the first main valve part is coupled together with the steering device and the second main valve part is coupled together with the damping housing of the steering damper, the device further comprising a third main valve part and a fourth main valve part arranged in the second main valve, wherein the third main valve part is coupled together with the steering device and the fourth main valve part is coupled together with the damping housing of the steering damper, wherein the first and the second and the third and the fourth main valve parts, respectively, are moveable with respect to each other such that they form a first and a second variable opening area through which the hydraulic fluid can flow.

15. The device of claim 14, wherein the opening area of the first main valve decreases and the opening area of the second main valve increases when the positions relative to each other of the first and the second and the third and the fourth main valve parts, respectively, are determined by a rotational motion in a first direction of the steering device or by a rotational motion in a second direction of the delimiting part of the steering damper, and where the opening area of the first main valve increases and the opening area of the second main valve decreases when the positions of the first and the second and the third and the fourth main valve parts, respectively, relatively each other is determined by a rotational motion in a second direction of the steering device or by a rotational motion in a first direction of the delimiting part of the steering damper.

16. The device of claim 15, wherein the first and third main valve parts of the first and second main valve move synchronously in relation to each other such that the opening area of the first main valve decreases substantially as much as the opening area of the second main valve increases, and vice versa.

17. The device of claims 16 further comprising a first driver and a second driver, wherein the first main valve part is coupled together with the steering device via the first driver and the third main valve part is coupled together with the steering device via the second driver.

18. The device of claim 17, wherein the first driver is coupled together with the first main valve part by means of a first link and the second driver is coupled together with the third main valve part by means of a second link, wherein the links are hinged at both ends.

19. The device of claim 17 further comprising at least one spring element wherein the first driver is configured to press against the first main valve part and the second driver is configured to press against the third main valve part by means of the at least one spring element.

20. The device of claim 19, wherein the at least one spring element is located between the first main valve part and the third main valve part such that the at least one spring element creates a pressing force acting on both valve parts.

21. The device of claim 13 further comprising a valve actuator coupled together with the steering device for actuating the first and second main valves during relative movement between the steering device and the attaching part thereby altering a first and a second variable opening area of the main valve.

22. The device of claim 13 further comprising a valve actuator coupled together with the attaching part for actuating the first and second main valves during relative movement between the steering device and the attaching part thereby altering a first and a second variable opening area of the main valve.

23. The device of claim 22, wherein the opening area of the first main valve decreases and the opening area of the second main valve increases when the position of the valve actuator part is determined by a rotational motion in a first direction of the steering device or by a rotational motion in a second direction of the attaching part, and wherein the opening area of the first main valve increases and the opening area of the second main valve decreases when the position of the valve actuator part is determined by a rotational motion in a second direction of the steering device or by a rotational motion in a first direction of the attaching part.

24. The device of claim 23 further comprising at least one elastic holding-up means arranged between the attaching part and the steering device, the at least one elastic holding-up means configured to determine the magnitude of the initial rotational motion.

25. The device of claim 23, wherein the steering device is coupled together with the attaching part via a torsion bar to allow relative rotational movement between the steering device and the attaching part about a central axis of the torsion bar.

26. The device of claim 25, wherein the central axis of the torsion bar is located at a distance from the steering axis.

27. The device of claim 26 further comprising at least two mechanical stops for limiting the relative movement between the attaching part and the steering device.

28. The device of claim 27, wherein the two mechanical stops comprise at least one element slideably arranged in an opening between two surface portions such that the element is moveable between the surface portions in order to limit the relative movement to rotational movement.

29. The device of claim 28 wherein the attaching part further comprises a fork crown arranged at a front fork arrangement of a motorcycle.

30. The device of claim 22, wherein the attaching part further comprises a cylindrical unit arranged around a steering connecting rod through which the steering axis runs.

31. The device of claim 30, wherein the attaching part is divided into an upper and a lower cylindrical part coupled together by an elastic holding-up means configured to determine the magnitude of an initial rotational motion.

32. The device of claim 31, wherein the steering damper is a linear damping device, and wherein the delimiting part is a piston attached to a piston rod for reciprocal movement within the damping chamber.

33. The device of claim 31, wherein the steering damper is a rotational damping device, and wherein the delimiting part is a wing attached to a lever for reciprocal movement within the damping chamber.

34. A steering damper configured to be arranged in a vehicle comprising a steering device rotatable about a steering axis for adjusting the direction of the part(s) of the vehicle configured for contacting the ground and an attaching part that couples together the part(s) arranged for contacting ground with the steering device, the steering damper comprising:
  a damping housing; and
  a main damping chamber defined by the damping housing, the main damping chamber comprising hydraulic fluid and being partitioned into a first and a second damping chamber;

wherein the steering device is mechanically connectable to the attaching part to enable rotation of the attaching part with the steering device and with the damping housing, and wherein a main valve unit is configured to adjust a flow of hydraulic fluid between the first and second damping chambers in order to adjust the rotational damping of the steering device, wherein the main valve unit can be mechanically coupled with both the attaching part and the steering device, and wherein a relative movement between the attaching part and the steering device determines an amount of hydraulic fluid flowing through the main valve unit.

35. A steering damper configured to be arranged in a vehicle comprising a steering device rotatable about a steering axis for adjusting the direction of the part(s) of the vehicle configured for contacting the ground and an attaching part that couples together the part(s) arranged for contacting ground with the steering device, the steering damper comprising:
   a damping housing; and
   a main damping chamber defined by the damping housing, the main damping chamber comprising hydraulic fluid and being partitioned into a first and a second damping chamber by a delimiting part,
   wherein the steering device is mechanically connectable to the attaching part to enable rotation of the attaching part with the steering device and with the delimiting part, and wherein a main valve unit is configured to adjust a flow of hydraulic fluid between the damping chambers in order to adjust the rotational damping of the steering device, wherein the main valve unit can be mechanically coupled together with both the attaching part and the steering device, and wherein a relative movement between the attaching part and the steering device when the steering damper is arranged in a vehicle determines an amount of hydraulic fluid flowing through the main valve unit.

36. A crown device configured to be arranged in a vehicle comprising a steering device rotatable about a steering axis for adjusting the direction of the part(s) of the vehicle configured for contacting the ground, the device comprising:
   a steering damper having a damping housing that encloses a main damping chamber which comprises hydraulic fluid and is partitioned into a first damping chamber and a second damping chamber by a delimiting part that is disposed in the main damping chamber and moveable with respect to the damping housing;
   an attaching part configured to couple together the part(s) configured for contacting the ground with the steering device when the crown device is arranged in the vehicle, wherein the attaching part is configured to rotate with the steering device when the crown device is arranged in the vehicle; and
   a main valve unit configured to adjust a flow of hydraulic fluid between the damping chambers of the steering damper when the crown device is arranged in the vehicle, the main valve unit being coupled together with both the attaching part and the steering device in order to adjust the rotational damping of the steering device, and wherein the amount of hydraulic fluid flowing through the main valve unit is determined by a relative movement between the attaching part and the steering device.

37. The device of claim 36, wherein the crown device further comprises attachment means configured to couple the steering device together with the attaching part and also configured to allow relative movement between the attaching part and the steering device when the crown device is arranged in the vehicle.

38. The device of claim 37, wherein the attachment means is configured to elastically couple the steering device together with the attaching part and is configured to elastically allow relative movement between the attaching part and the steering device when the crown device is arranged in the vehicle.

39. The device of claim 38, wherein the main valve unit is mechanically coupled together with both the attaching part and the steering device in order to adjust the rotational damping of the steering device.

40. The device of claim 38 wherein the crown device further comprises an electronic sensor adapted to measure the relative movement between the attaching part and the steering device.

41. The device of claim 40, wherein the electronic sensor is selected from a group of sensors comprising: a potentiometer, a hall effect sensor, and an optical sensor.

42. The device of claim 40, wherein the electronic sensor is configured to measure the magnitude and the direction of the relative movement between the attaching part and the steering device when the crown device is arranged in the vehicle.

* * * * *